E. N. HUSSEY.
SAW CLAMP.
APPLICATION FILED NOV. 4, 1916.
1,254,597.
Patented Jan. 22, 1918.
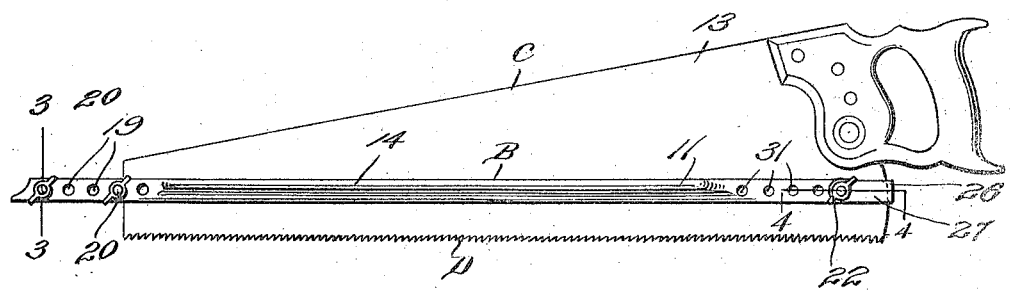
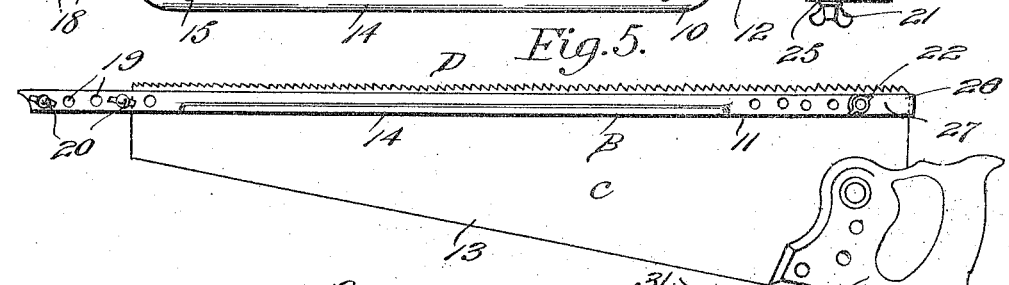
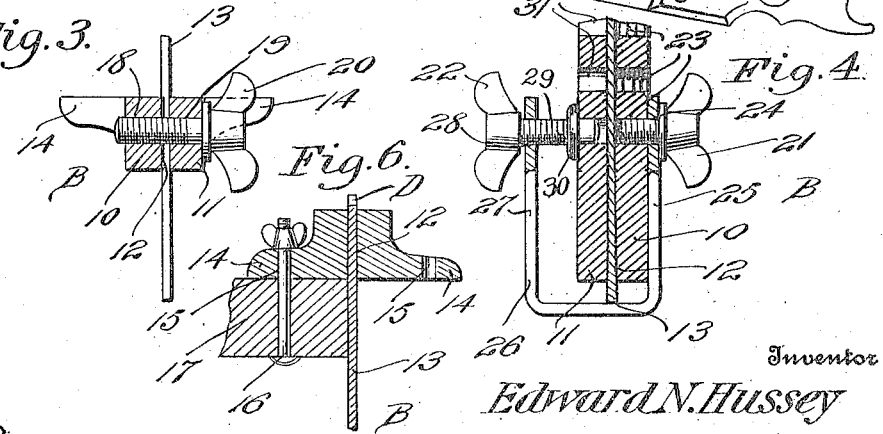
Inventor
Edward N. Hussey
By Victor J. Evans
Attorney
Witness

UNITED STATES PATENT OFFICE.

EDWARD N. HUSSEY, OF VINELAND, NEW JERSEY.

SAW-CLAMP.

1,254,597.

Specification of Letters Patent.　Patented Jan. 22, 1918.

Application filed November 4, 1916. Serial No. 129,595.

*To all whom it may concern:*

Be it known that I, EDWARD N. HUSSEY, a citizen of the United States, residing at Vineland, in the county of Cumberland and State of New Jersey, have invented new and useful Improvements in Saw - Clamps, of which the following is a specification.

This invention relates to saw clamps, and has for an object to provide a combination saw clamp or vise, capable of being employed for facilitating the operation of filing or sharpening the teeth of a saw, and, in addition, to be equally applicable in the capacity of a depth gage for regulating the cut of a saw.

Another object of the invention resides in an improved saw vise or clamp, operable to be conveniently associated with a suitable stationary support, and having improved features of construction which will serve to rigidly retain a saw within the jaws of the device, whereby accidental displacement of the saw will be effectively prevented when the latter is being repaired or otherwise operated on.

A further object rests in a saw vise for rigidly supporting a saw, and of such construction that the jaws of the vise will grip the saw throughout its longitudinal length, so that the bowing or vibrating of the saw will be prevented during the filing thereof.

A still further object resides in a saw vise of novel formation, having the parts thereof so disposed that the toothed edge of the saw will be unobstructed and exposed through the entire length thereof, so that no part of the clamp will in any way interfere with the repairing of the saw.

Other features of the invention reside in a saw vise of the above character which may be employed, under certain conditions, as a depth gage for regulating the depth of a cut the saw is desired to make.

Finally, the invention consists of a saw attachment or clamp which may be conveniently carried or packed away in any ordinary tool box, in order to facilitate the handling of the clamp; in a practical and inexpensive tool of the type set forth which will efficiently perform its assigned functions; one which will not be liable to become out of order or broken, and of strong and durable construction to withstand the wear and knocks of constant service.

Other objects will be in part obvious and in part pointed out hereinafter.

The invention accordingly consists in the features of construction, combinations of elements and arrangement of parts which will be exemplified in the construction herein described and the scope of the application of which will be indicated in the following claims.

In the drawings,

Figure 1 is a side elevation of the saw clamp, illustrating a saw associated therewith, Fig. 2 is a bottom plan view thereof, Fig. 3 is a transverse section taken on the line 3—3 of Fig. 1, Fig. 4 is a horizontal section taken on the line 4—4 of Fig. 1, and Fig. 5 is a side elevation of the clamp, disclosing the same applied to a saw and serving in the capacity of a depth gage.

Fig. 6 is a sectional view illustrating the manner of connecting the clamp with a fixed support.

Similar characters of reference denote corresponding parts throughout the several views of the drawing.

In the preferred embodiment of the present invention, I provide a saw vise or clamp B, which is adapted to be primarily utilized in clamping a saw C into a stationary position therein, whereby the teeth D of the saw may be readily sharpened or filed. The clamp B consists of a pair of metallic coöperating jaws 10 and 11, between which a saw C is adapted to be positioned. The jaws embody normally bowed, resilient saw engaging surfaces 12, as shown in Fig. 2 which, when in a position to clamp the blade 13 of the saw C, will engage with an evenly distributed pressure, the blade 13 throughout the entire length of the latter. The jaws 10 and 11 are further provided with longitudinally extending, offset flanges 14, the latter being provided with openings 15 through which bolts or their equivalent 16, provided with a permanent support 17, may pass, in order to firmly secure the clamp to the support 17. However, the clamp may be readily removed from the support 17 and associated with the blade 13, so that it may be employed as a depth gage for regulating the extent of a cut the blade 13 is desired to make.

In order to securely fasten the clamp B to the saw C, the jaw 10 is provided, adjacent to one of its extremities, with a plurality of horizontally alined threaded openings 18, which register with non-threaded openings 19 formed in the jaw 11. Threaded hand bolts 20 pass through the openings 19 and engage with the threads of the openings 18, whereby upon the rotation of the bolts in a predetermined direction the jaws 10 and 11 will be drawn into closer relation, so as to clamp the saw C thereto.

The opposite extremity of the clamp B is secured to the blade 15 through the agency of a plurality of hand bolts 21 and 22, normally disposed on opposite sides of the saw. In this instance the jaw 11, at the extremity opposite the openings 19, is formed with a plurality of threaded openings 23, which are adapted to receive the threaded shank of the bolt 21, the latter, also, passing through an opening 24 formed in one arm 25 of a U-shaped yoke or bolt vise 26. The opposite arm 27 of the member 26 is provided with a threaded opening 28, for the reception of the threaded shank 29 of the bolt 22. The shank 29 is provided with a fixed collar 30 at a point adjacent to the end of the shank, and the latter is adapted to enter one of a plurality of openings 31 formed in horizontal alinement in the jaw 10, at the extremity opposite that where the openings 23 are formed. Therefore, it will be apparent that the rotation of the bolts 21 and 22 in a certain direction will force the both ends of the jaws 10 and 11 into close frictional relation with the saw blade 13, whereby the saw C will be securely retained in a fixed position within the clamp B.

It will be noted that by tightening the hand bolts, above described, that the jaws 10 and 11 will be forced to engage the blade 13 with a strong, evenly distributed pressure through the entire length of the saw, so that the latter will be effectively prevented from slipping while positioned in the clamp B. This feature is further benefited by the action of the yoke 26 which serves to maintain the forward end of the saw in contact with one of the hand bolts 20, while the rear extremity of the saw is egaged by the connecting web of the yoke. Thus it will be apparent that the saw will be prevented from moving laterally while positioned in the clamp by the action of the yoke 26, and will be prevented from moving vertically by the construction of the jaws 10 and 11.

By removing the clamp from the support 17, the saw may be secured in any desired vertical position upon the blade 13, as shown in Fig. 5, whereby it may serve to regulate the depth of a cut to be made by the blade 13, as will be readily understood.

From the foregoing it will be observed that the clamp B comprising the present invention, is capable of being conveniently associated with a saw, and when the latter is once secured therein, it will not be liable to slip so as to give occasion for readjustment. The device is simple in construction, of but few parts and will not be liable to become out of order. By reason of its compact construction, it may be readily carried in a tool box or the like, and, therefore, will not be cumbersome or awkward to handle. In conclusion, attention is directed to the fact that the teeth of the saw 10 when connected with the clamp will be presented in an unobstructed line, so that they will be readily accessible for purposes of repair.

Having described the invention, what is claimed as new and patentable is:—

1. A saw clamp embodying a plurality of normally bowed resilient jaws, clamping means connected with the extremities of said jaws and operable to frictionally retain a saw in a stationary position between said jaws, and a yoke connected with said clamp and adapted to engage with one edge of said saw to prevent lateral movement on the part of the latter when connected with said clamp.

2. A combined saw clamp and depth gage embodying a pair of resilient, coöperating saw engaging jaws, adjustable clamping means operable to compress the extremities of said jaws to effect the securing of a saw therebetween, a U-shaped yoke connected with said clamp and so related with said saw as to prevent lateral movement on part of the latter when confined between said jaws.

3. A saw clamp embodying a plurality of normally bowed and resilient saw engaging jaws, clamping means connected with said jaws, adjacent to their extremities, and operable to effect the securing of a saw therebetween, said clamping means including hand bolts operable to engage with threaded openings formed in the forward extremities of said jaws, of opposed hand bolts associated with the rear extremity of said jaws, and a yoke connected with said rear hand bolts and adapted to coöperate with said saw to prevent lateral movement on part of the same when associated with said clamp.

4. A saw clamp consisting of a pair of parallel extending clamping jaws, bowed and resilient saw engaging surfaces formed with said jaws, means connected with the extremities of said jaws to draw the bowed portions together so as to effect the securing of the saw therebetween, and horizontally extending webs projecting from said jaws and operable to facilitate the securing of the clamp to a stationary support.

5. A saw clamp embodying a pair of resilient coöperating saw engaging jaws, means passing through one end of the jaws for connecting the same together, adjustable clamping means passing through the jaws at point adjacent the opposite end thereof and operable to compress the extremities of said jaws to effect the securing of a saw therebetween, and means carried by the adjustable clamping means and embracing one extremity of the saw, tending to force the opposite end of the saw in contact with the jaw connecting means for preventing any lateral movement of said saw.

In testimony whereof I affix my signature.

EDWARD N. HUSSEY.